United States Patent
Ryabov et al.

(10) Patent No.: US 9,942,177 B1
(45) Date of Patent: Apr. 10, 2018

(54) METHOD AND SYSTEM FOR REAL-TIME DATA UPDATES

(71) Applicant: SYNQQ, Inc., Sunnyvale, CA (US)

(72) Inventors: Andrey Ryabov, Sunnyvale, CA (US); Ramu Sunkara, Los Altos, CA (US)

(73) Assignee: Synqq, Inc., Sunnyvale, CA (US)

( * ) Notice: Subject to any disclaimer, the term of this patent is extended or adjusted under 35 U.S.C. 154(b) by 164 days.

(21) Appl. No.: 14/709,137

(22) Filed: May 11, 2015

Related U.S. Application Data (60) Provisional application No. 62/136,616, filed on Mar. 22, 2015.

(51) Int. Cl.
*H04L 29/08* (2006.01)
*H04L 12/58* (2006.01)
*H04L 29/06* (2006.01)

(52) U.S. Cl.
CPC .............. *H04L 51/04* (2013.01); *H04L 67/10* (2013.01); *H04L 67/42* (2013.01)

(58) Field of Classification Search
CPC ................ H04L 67/10; H04L 67/42
USPC ........................................ 709/206
See application file for complete search history.

(56) References Cited

U.S. PATENT DOCUMENTS

| | | | |
|---|---|---|---|
| 8,966,074 B1* | 2/2015 | Richards | H04L 43/08 709/224 |
| 2011/0258049 A1* | 10/2011 | Ramer | G06F 17/30867 705/14.66 |

* cited by examiner

*Primary Examiner* — Adnan Mirza
(74) *Attorney, Agent, or Firm* — Prasad IP, PC (57) ABSTRACT

A cloud information service provides information delivery substantially in real-time to in-network users and out-of-network users. Information delivered is formatted to appear visually as a card (a "smartcard") for both in-network and out-of-network users. Real-time communication by way of messaging is enabled with any user whether they are in-network or out-of-network. Users of the cloud information service may employ mobile devices or desktop or laptop computers. Updates in substantially real-time are provided to the smartcards as the data sources change. The data sources may include enterprise and Internet data. The information is provided in a manner to remain current for mobile users and is efficient for mobile networks that can often experience poor connectivity and limited bandwidth.

17 Claims, 9 Drawing Sheets

METHOD AND SYSTEM FOR REAL-TIME DATA UPDATES

RELATED APPLICATIONS

This application claims the benefit of provisional application No. 62/136,616 filed on Mar. 22, 2015.

FIELD OF THE INVENTION

This invention relates to computerized information systems and more particularly to communications and data updates substantially in real-time.

BACKGROUND

Information is increasingly available via a variety of forms. For example, the World-Wide Web (WWW) provides a rich and dynamic source of information via web pages that may be static or dynamic. Additionally, messaging, in the form of e-mail, SMS permits information to be communicated between individuals and to individuals from automated messaging systems such as email based news servers. Messaging among users subscribed to proprietary networks such as Facebook and LinkedIn is also possible.

While the above-described systems have greatly improved information delivery, there remains a need for improved methods and systems of information delivery that provide timely delivery of information from a variety of sources in a flexible manner to a variety of recipients without having to have all the recipients be part of the same network.

SUMMARY

Embodiments disclosed herein provide computerized methods and systems that operate to provide improved delivery of messages and other information in substantially real-time. Moreover, delivery of such information is not limited to users within a particular network that requires such users to be pre-registered. Instead, embodiments disclosed herein can provide message and other information delivery to any user, irrespective of whether such user is pre-registered as a member of a particular network. Moreover, such information may be delivered to users on a variety of devices including mobile phones, tablets and desktop and laptop computers. The information may be text based or incorporate rich-media aspects such as audio and video.

In disclosed embodiments, in-network users, in other words users registered to a prescribed service (referred to herein as a cloud service) and interacting with the service via a customized interface, such as provided by an application, may share some relevant content that may preferably be formatted to appear visually as a card (a "SmartCard"), and have instant communication around this content with any of their contacts who are out-of-network users (in other words, users that are not registered with the cloud service) on desktops and mobile devices. Updates in substantially real-time are provided to the SmartCards as the data sources change. The data sources may include enterprise and Internet data. The information is provided in a manner to remain current for mobile users and is efficient for mobile networks that can often experience poor connectivity and limited bandwidth.

The real-time communication is therefore not limited to users within a particular service but instead can be with anyone with a device that has a web browser. This permits widespread communication to users employing a wide range of devices and applications. In particular, in the mobile environment where users expect immediate responses, the disclosed embodiments provide a much more satisfactory user experience by providing substantially real-time communications with all users in their contact list, i.e. not only to in-network users but also to out-of-network users. As such, a user of a mobile device can initiate communication with anyone on their contact list, irrespective of whether the recipient is in-network or out-of-network. That out-of-network recipient can benefit from the same user experience provided by the SmartCard as in-network users using the mobile application. As data exchanged is changed at the source, which may be from publicly available sources on the Internet, or may be internal data from within an enterprise, the cloud service provides updates to all recipients of the data substantially in real-time.

The disclosed embodiments employ an efficient technique that stores relevant information locally and that stores and monitors exchanged information at a granular level, thereby permitting identification and transmission of granular pieces of information that have been updated. There are a number of benefits to this technique. First, the user interface is very responsive because most objects are usually found in the cache. Second, there is an eventually consistent state, because there is always synchronization with the server. Third, it works offline. If an Internet connection is not available, then the objects are returned from the local cache. Fourth, network traffic is minimized because only changed objects are passed over the network.

Additional aspects related to the invention will be set forth in part in the description which follows, and in part will be apparent to those skilled in the art from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Figure 1:
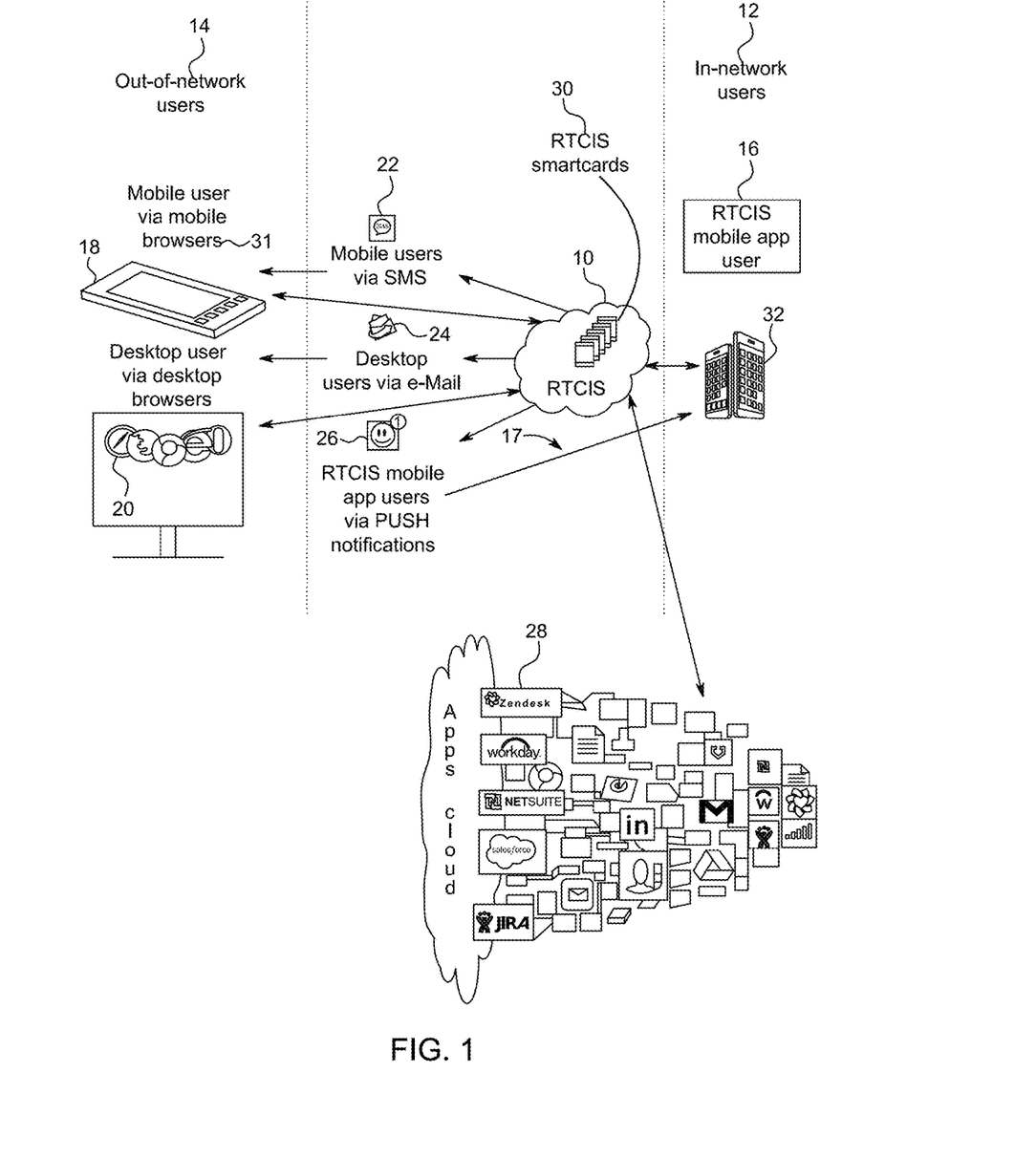
FIG. 1 is a block diagram illustrating information flow within a preferred embodiment of a cloud information service.

FIG. 1 is a block diagram illustrating information flow within a preferred embodiment of a Real-Time Cloud Information Service (RTCIS) 10. As used within this specification, the term real-time refers to communication that appears to a user as occurring substantially in real-time, in other words with minimal perceived delay between transmission of information and receipt and presentation of the information on the recipient device. RTCIS 10 provides information to a variety of different users such as in-network users shown generally at 12 and out-of-network users shown generally at 14. In-network users 12 are users registered with the RTCIS 10 and interacting with the RTCIS 10 via a customized interface, such as provided by a Mobile Application shown generally at 32, which enables interaction with RTCIS 10 via a formatted interface that may visually resemble a card, referred to herein as a "SmartCard". Advantageously, the RTCIS 10 also enables real-time communication via SmartCards to out-of-network users. An in-network user is therefore not limited to real-time communications via RTCIS 10 to only in-network users but may communicate in real-time with any user. As explained herein, the RTCIS 10 provides the necessary code to the device of an out-of-network user to enable real-time communications via the visually appealing and contextualized interface of a SmartCard.

The SmartCard may be formatted to present and receive information by way of a simplified user interface that facilitates input and output of information via the limited display screen space of a mobile device. The SmartCards may employ a variety of different data formats including text and rich media such as images, video, and voice. Visual representation of a plurality of SmartCards, each presenting information in a contextualized manner and selectable by a user, provides a simplified user interface that facilitates the consumption and entry of information by a user of the RTCIS 10. Each SmartCard preferably consists of three components: (i) a data object that may contain reference to other objects, (ii) logic that handle users interaction with the card, and (iii) an HTML5 representation of the card. A card may have several representations in order to accommodate different devices and form factors. The SmartCards 30 are preferably packaged into a binary format such as Binary JSON (BSON) to optimize use of bandwidth to transmit to the user's mobile device where it is cached and rendered using proprietary mobile storage engine and template-driven renderer.

In certain embodiments, the SmartCard 30 may appear visually as a rectangular card shaped container and be employed as a fundamental unit of consumption or interaction with RTCIS 10. In such an embodiment, the SmartCard 30 has the following properties:

- A fixed dimension (border) for a given mobile device form factor. All cards on a given mobile device type (iPhone 6, iPhone 5c, iPhone 5s, Samsung Galaxy 3, iPad, iPad Mini etc.) look identical in shape.
- A front and back face.
- Can display information on only the front face, or on the front and back face.
- Can either be static—i.e. an image, or dynamic—i.e. show information in it that may change over time or for each target device or user.
- Interactive—has one or a few actions embedded in the card for the user to perform.
- Branded or brandable based on source(s) of information.
- Connection properties to the source/s of content available on the card.
- A lifespan associated with it. Default lifespan is forever but there may be some SmartCards that exist only for a given span of time.
- Connection properties related to a source of content. For example, for a company profile SmartCard from for example, Salesforce.com, the salesforce instance URL, username and password are required to connect to the salesforce instance to retrieve specific information related to a target user and their context.
- A transportable unit of content that has a variable length mix of text, images, video and voice relevant to a user context and about a person, company or location. Context Intelligence functionality may be used to determine the relevance of one or more SmartCards for a given user's context and delivering these SmartCards to the user (devices).

In-network users 12 may exchange information with other in-network users 12 as seen at 17. In-network users 12 may also advantageously exchange information with users that are not registered with RTCIS 10, or with users that are registered with RTCIS 10 but that are not using Mobile App 32. As used herein, the term "out-of-network user", shown generally at 14, refers to a user that is not registered to the RTCIS 10 or to an in-network user that is not using Mobile Application 32. Out-of-network users 14 may interact with the RTCIS 10 via a variety of devices including a browser on a mobile device 18 or a browser on a laptop/desktop computer 20.

The RTCIS 10 employs a variety of notification mechanisms to communicate with in-network users 12 and out-of-network users 14, such as SMS (Short Message Service) 22, e-mail 24, or push notifications 26. This permits widespread notification to users employing a wide range of devices and browsers to facilitate real-time communications. For example, the RTCIS 10 is not limited to communication within a particular application, as is the case with messaging capabilities provided by available on-line services. Moreover, while some on-line services can send a communication, such as an e-mail, to a recipient outside of the service, that communication is not in real-time. Moreover, unlike conventional messaging systems, the RTCIS 10 also permits real-time conversation (ie, bi-directional, or multi-way communication of information) in multiple contexts such as sales opportunities, sales pipeline, sales history, calendar entries, etc. of any information in the Enterprise or Internet sources of data shown generally at 28. The RTCIS 10 advantageously operates with numerous sources of data shown generally at 28. Such sources can include publicly available data on the World-Wide Web and can also include private or proprietary sources of data such as may be available via subscription based information services or corporate data sources. The RTCIS 10 interacts with such information sources 28 to provide real-time updates to the SmartCards 30 as the target data sources change.

The RTCIS Mobile Application 32 may take a variety of forms, such as an iOS application consisting of two main parts: user interface and RTCIS Base library 34 that implements an object cache and network protocol on top of WebSockets. The RTCIS Web Client such as shown at 18, 20 is preferably an HTML5 application that works on all modern web browsers. Web clients 18, 20 also have a JavaScript implementation 34 of the RTCIS Base library.

When an in-network user shares a SmartCard with other users the following events occur via the RTCIS 10: (i) Notification: The recipient is informed of the new content shared, and (ii) Messaging: After the recipient gets the notification, the users message each other on the SmartCard content in real-time.

An in-network user 12 may share, from their phone, with a contact, one or more SmartCards. As shown in FIG. 1, the RTCIS 10 sends a variety of notifications to different users. For example, mobile users will receive an SMS 22, desktop users will receive an e-mail 24, and RTCIS Mobile App users will receive a push notification 26. The recipient users may be in-network 12 and or out-of-network 14 users. RTCIS 10 employs user management software that has a map of the list of mobile numbers and email ids that are in-network users and if the requested mobile # or email id is not part of this list, then RTCIS 10 determines it as an out-of-network user.

For out-of-network users, if the shared information is being sent to a mobile number and when the RTCIS 10 resolves the recipient as out-of-network, then a SMS with the URL link (to the SmartCard 30) is sent by RTCIS 10 to notify the out-of-network user. Along the same lines, if the shared information is being sent to an out-of-network user who is not on a mobile device then an email message with the URL link is sent to the user as a notification. Upon receiving the URL link, the out-of-network user may activate the link, such as by clicking on the link. This causes a request to the RTCIS 10 for base library 34 that provides a user interface and other functionality for communicating via the RTCIS 10 by way of SmartCards 30.

When transmitting information from one in-network user to another in-network user, the RTCIS 10 employs a first technique if the receiving user is connected, such as by being logged-in to the RTCIS 10 via the Mobile Application 32. In this case, the RTCIS 10 sends a RTCIS PUSH notification to a RTCIS base library associated with the receiving user's Mobile App 32 about the newly shared information. If the recipient user is in-network but is not connected to the RTCIS 10, then the RTCIS 10 sends a PUSH notification via a push service such as for example, Apple APN, to the target user's mobile device. This notification includes a link such as a Uniform Resource Locator (URL) that the receiving RTCIS Mobile App 32 employs to request RTCIS 10 to provide information associated, such as in the form of the appropriate SmartCard 30, with the URL.

The following table summarizes the types of notifications used by the RTCIS 10 when an in-network user 12 shares SmartCards 30:

| User | Type | Delivery Network |
| --- | --- | --- |
| Out-of-Network Users 14 | SMS | via Mobile Operators SMS |
| Out-of-Network Users 14 | e-Mail | via RTCIS 10 to 3rd party mail service |
| In-Network Users 12 (when Mobile App 32 is connected) | RTCIS PUSH | via RTCIS 10 to RTCIS Base 34 |
| In-Network Users 12 (when Mobile App 32 is disconnected) | PUSH (dependent on receiving device) | via PUSH network required by receiving device |

Figure 2:
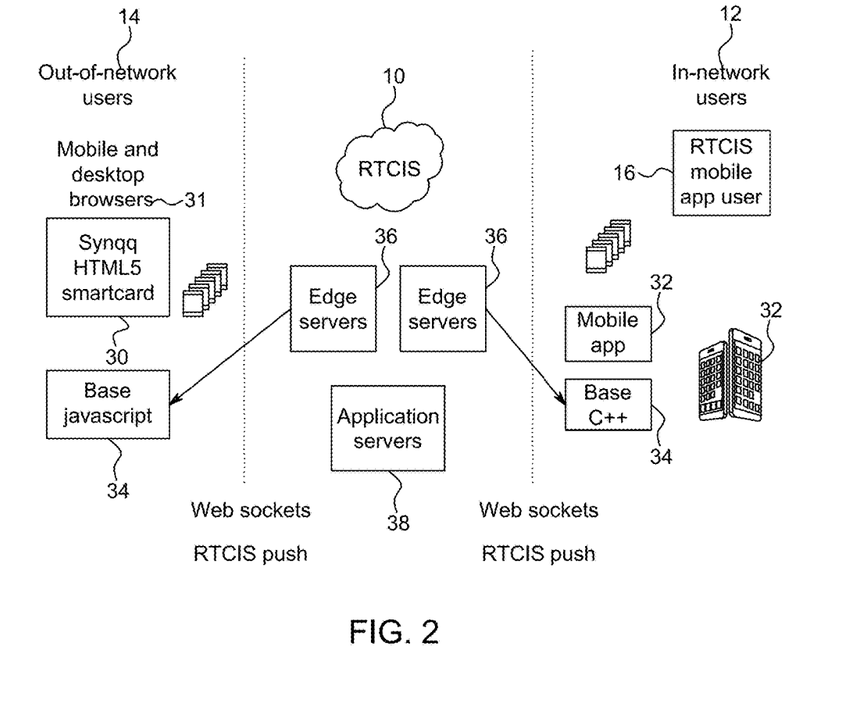
FIG. 2 illustrates further details of the cloud information service of FIG. 1.

Turning to FIG. 2, a base library 34 is associated with each client such as Mobile App 32, or for browsers that may be used by out-of-network users 14. The base library 34 accompanies Mobile App 32 when it is downloaded and installed to a mobile device of an in-network user 12. For out-of-network users, the base library 34 is downloaded and installed from RTCIS 10 upon activation for the first time on the associated mobile device of a URL link provided by the RTCIS 10. Any updates to base library 10 may be provided subsequently by RTCIS 10. RTCIS Application servers 38 maintain the state of RTCIS objects that are cached in RTCIS Base libraries 34 and if any of them change, the servers 38 send RTCIS Push Notifications to both in-network (RTCIS Mobile Application) and out-of-network (RTCIS Web Clients) users. The RTCIS objects are preferably implemented in the form of HTML 5 objects. By storing information to be communicated in such a form and by tracking any changes in the server, the RTCIS 10 can provide real-time updates that are highly bandwidth efficient. In other words, when content tracked by RTCIS 10 in the form of an object changes, only the changed object is transmitted to a receiving client (Mobile App 32 or browser 31). This is far more efficient than a retransmission of an entire web page such as performed by many conventional systems. In particular, the granular update of a changed object by RTCIS 10 makes efficient usage of wireless bandwidth, which can be limited and highly variable. This efficient usage ensures that communications can be in real-time, without suffering the latency often incurred by transmission of updates incorporating large amounts of unnecessary data.

In FIG. 2 the RTCIS 10 is connected with Mobile App 32 via base client libraries 34 and WebSockets as specified by the IETF in RFC 6455. When the user, for example in-network user 12 sends a message, the RTCIS 10 determines the users that will receive the RTCIS PUSH notification. The Push notification in the client fetches the new message from the RTCIS 10 to display in the Mobile App 32 (for in-network user 12) and web client 18 or 20 (for out-of-network user 14). Real time messaging between clients is facilitated by the RTCIS PUSH notifications.

Figure 3A:
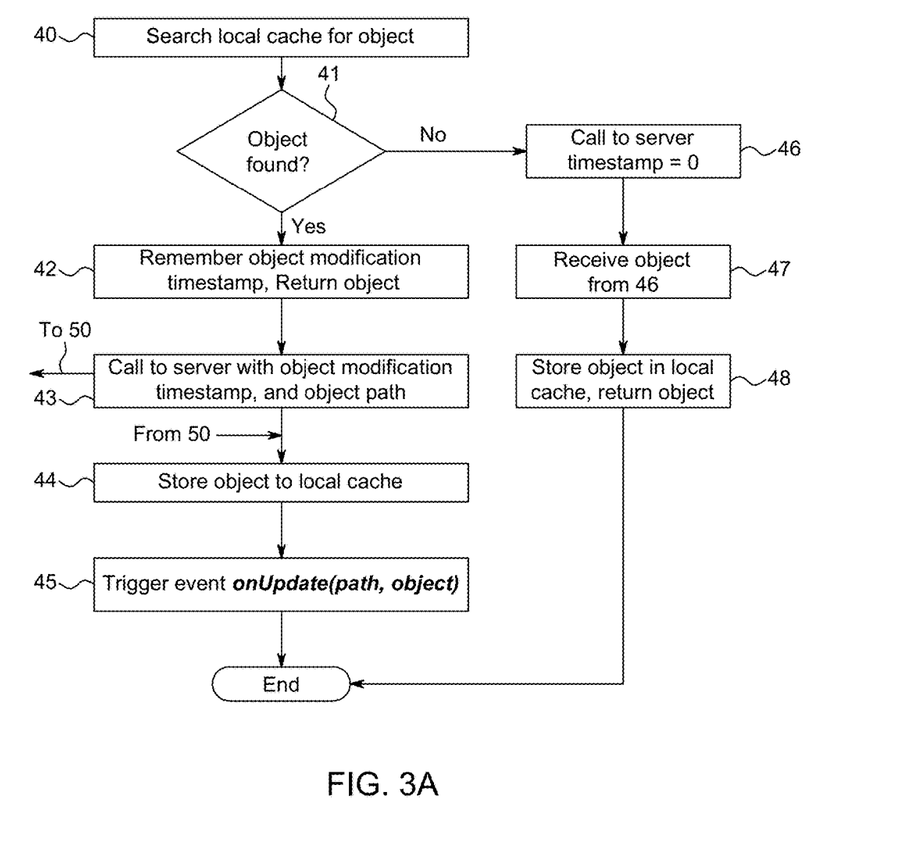
FIGS. 3A and 3B are flowcharts illustrating operation of an aspect of the cloud information service.
Figure 3B:
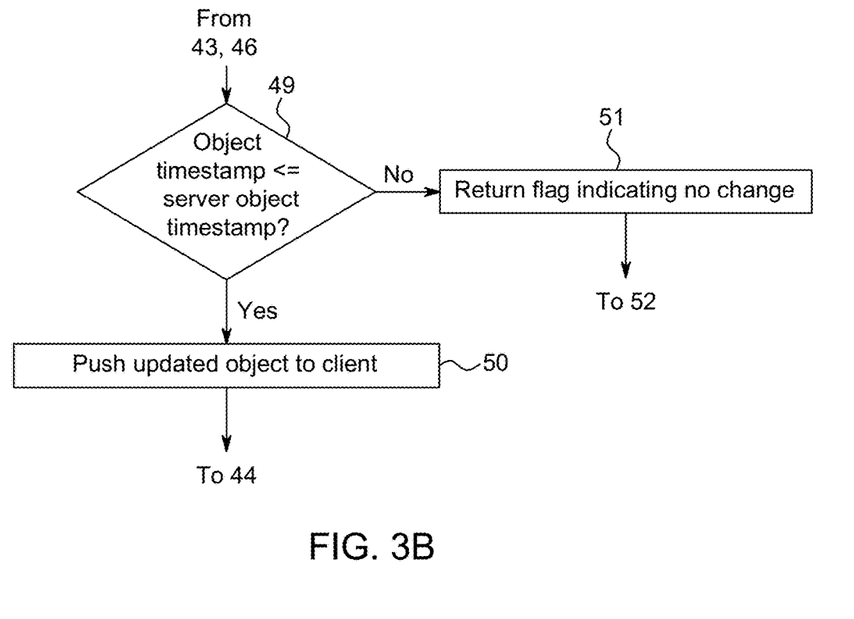

The RTCIS object retrieval protocol (Object Protocol) operates as illustrated in FIG. 3A and 3B follows. There are two main methods in the RTCIS Base API:

getObject(path)—api call, retrieves object from server or local cache.

onUpdate(path, object)—event, fires when object update has been detected.

When a client wants to access some object it makes a getObject API call, passing object path as a parameter. getObject works as follows. At step 40, using path as a key, the client searches its local cache for the object. If the object is found 41, at step 42 the client remembers the object modification timestamp and returns the object. At step 43, the client makes a call to the server with the object modification timestamp received at step 42, and the object path. Turning to FIG. 3B which illustrates the operations by the server at RTCIS 10, at 49 the server checks if the object timestamp received is less or equal than timestamp of the object with the same path stored on the server, and if so at 50, pushes the updated object to the client. In the other case the server at 51 returns a special flag indicating that content of the object has not changed and the routine terminates at 52. Returning to FIG. 2A, at 44, the client receives and stores the received object to its local cache and triggers the event onUpdate(path, object) the updated object. If at 41 the object is not found, the client makes at 46, a call to the server with the timestamp set to 0. The client receives at 47 the object from the server in the client's local cache and at step 48, stores the object in its local cache and returns the object.

In short, the algorithm always checks the local cache first and returns an object if it was found and after that goes to the server and checks if there is an update the object and if the object was updated sends it to the client and the client triggers an object updated event. There are several benefits of using this algorithm. First, the user interface is very responsive because most objects are usually found in the cache. Second, there is an eventually consistent state, because it always synchronizes with the server. Third, it works offline. If an Internet connection is not available objects are returned from the cache. Fourth, network traffic is minimized because only changed objects are passed over the network.

The client preferably renders the user interface by maintaining the list of object paths that were used for rendering of each UI component. When onUpdate(path, object) events occurs, the user interface re-renders only the components that depend on this particular object path, leaving other components intact. Once the users are notified by the above mechanism of the shared information, they now communicate with each other using the Object Protocol discussed in connection with FIGS. 3A, 3B.

Figure 4:
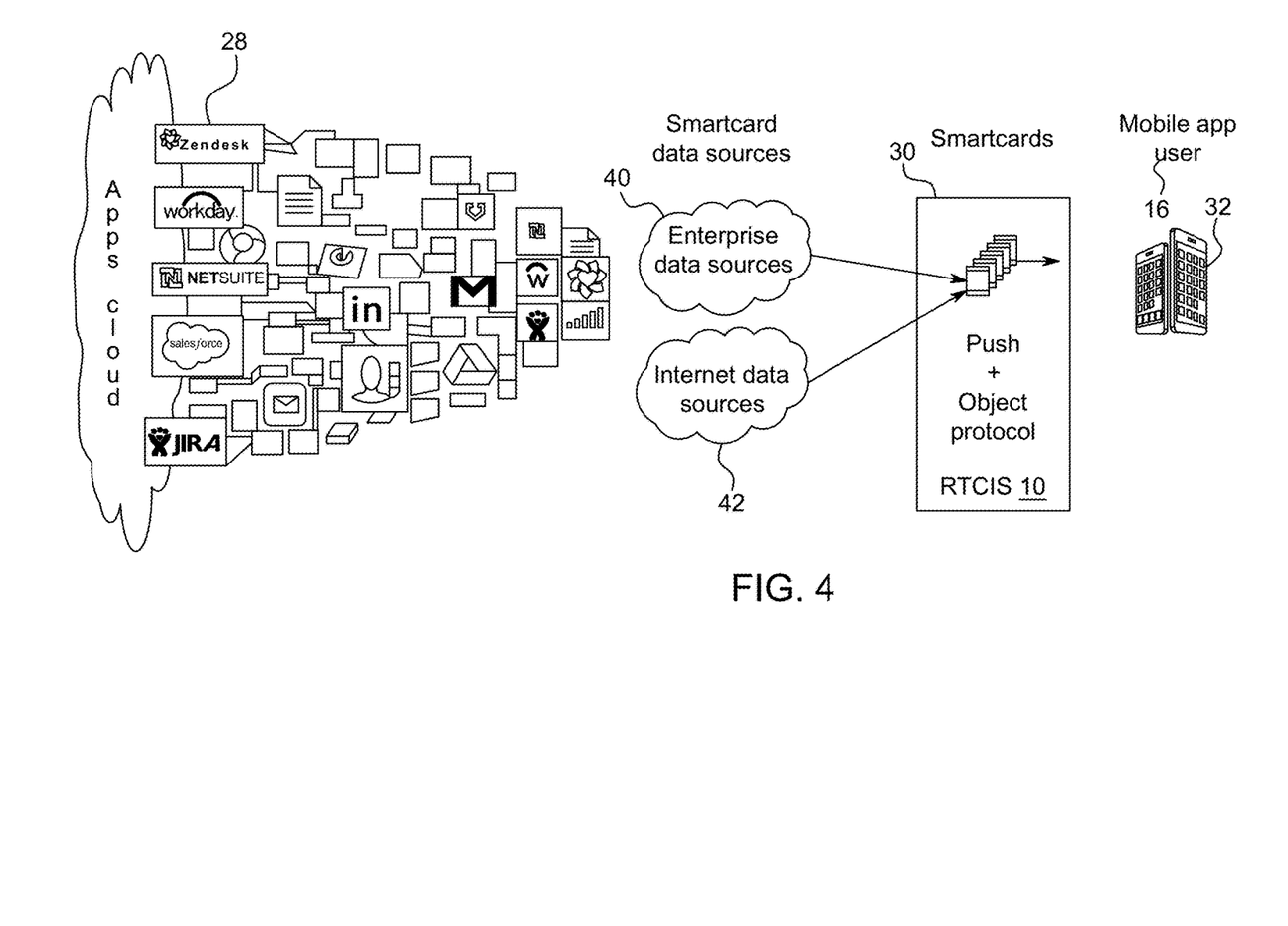
FIG. 4 and FIG. 5 illustrate examples of information flow within the cloud information service.
Figure 5:
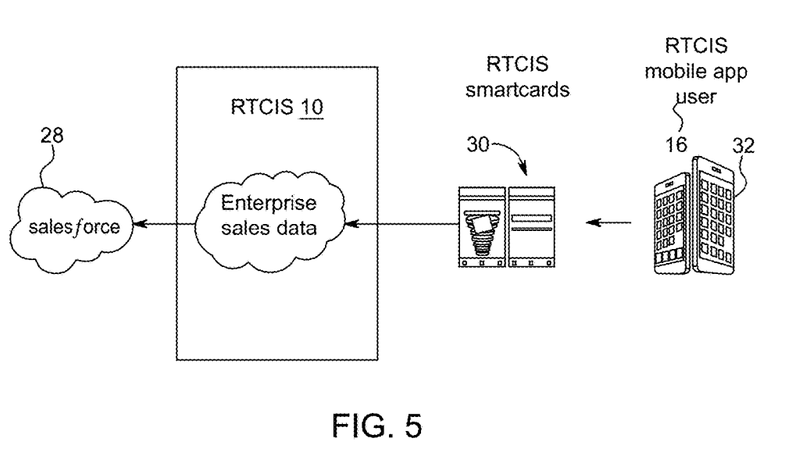

The RTCIS 10 provides real-time updates for one or more of the relevant SmartCards as the data source on the Internet or enterprise content changes. The RTCIS 10 allows instant, incremental updates to existing content when they change at the source. For example, if a new email arrives in your work email regarding an upcoming meeting, context intelligence functionality in the RTCIS 10 determines relevance to a given current or future Smartcards and updates the appropriate SmartCards. Continuing with this example, a SmartCard may exist for the upcoming meeting, where the SmartCard contains information such as meeting, place, time, subject and attendees. This SmartCard may be updated with the contents of the newly received email that may indicate for example, agenda items for the meeting. The context intelligence functionality determines if the email is relevant to the meeting SmartCard by correlating information in the metadata or body of the email with information regarding the upcoming meeting. For example, the subject line may correlate with the subject of the meeting or the content of the email indicates that it is related to the meeting. The RTCIS 10 updates the upcoming meeting SmartCard with relevant information from the incoming email. This update is immediately reflected in the SmartCards to all the users viewing this SmartCard in the Mobile Application 32 and web client users. Only the changed content is invalidated using RTCIS PUSH, and updated using RTCIS Object Protocol. Similarly, the RTCIS 10 uses Web Hooks (user-defined HTTP callbacks) to get notified when changes occur to enterprise content 40 and triggers the update process to all the relevant SmartCards. For example, a change to the location of the meeting entered into the calendaring application of an enterprise would be transmitted to the relevant SmartCards. Moreover, the RTCIS 10 also provides updates in third-party content that may be obtained from Internet data sources 42. For example, in the meeting example above, the relevant SmartCards may be updated with weather information from data sources 42 regarding weather on the date of the meeting, or may be updated with traffic information regarding traffic conditions in the vicinity of the meeting location. The foregoing functionality allows for real-time synchronization of changes to operational content—in the enterprise or on the Internet—instantly to a user filtered by relevance to them thereby bringing the world of data and content closer to the user when they need it. As seen in FIG. 4, this permits not just a snapshot of enterprise and Internet data, but also remains current for mobile users. Data sources 28 can include enterprise data sources 40 and generally available Internet data sources 42. The RTCIS 10 provides real-time updates to SmartCard 30 content from the Internet and enterprise data sources and provides them to Mobile App user 16 via Mobile App 32. FIG. 5 illustrates the flow of data from the Mobile App 32 to an enterprise data source 28. An update by the Mobile App user 16 to a SmartCard 30 via the Mobile App 32 is provided to RTCIS 10, which implements a form of write-through cache, by providing the data to the enterprise data source 28.

Returning to FIG. 2, the software components that enable viewing of a SmartCard 30 in the Mobile App 32 can be seen. The RTCIS Base Library 34 is a client side library that implements an object cache, an object loading protocol and a wire protocol based on WebSockets as specified by the IETF in RFC 6455. The Base Library 34 is preferably implemented in two variants: JavaScript for Web Browsers and in C++ for Mobile App 32. The C++ Base Library 34 is downloaded to mobile device 16 in conjunction with download and install of Mobile App 32. The JavaScript Base Library 34 is downloaded to a browser 31, if not already present, when a URL provided from RTCIS 10 in connection with a message is accessed. This causes a download of the RTCIS JavaScript Base Library, which is then available for subsequent real-time communications.

Objects have arbitrary structure and may have references to other objects. Each object is transferred over the network and stored in the local cache in BSON (Binary JSON) format. Each object has a path that uniquely identifies the object. The path is similar to a path in a file system and has the following format [userId, objectType, id1, id2, . . . ] where:

userId—identification of the user who owns the object
objectType—type of the object
id1, id2, . . . some identification specific to particular objectType.

Each object has a timestamp of last modification.

Figure 6:
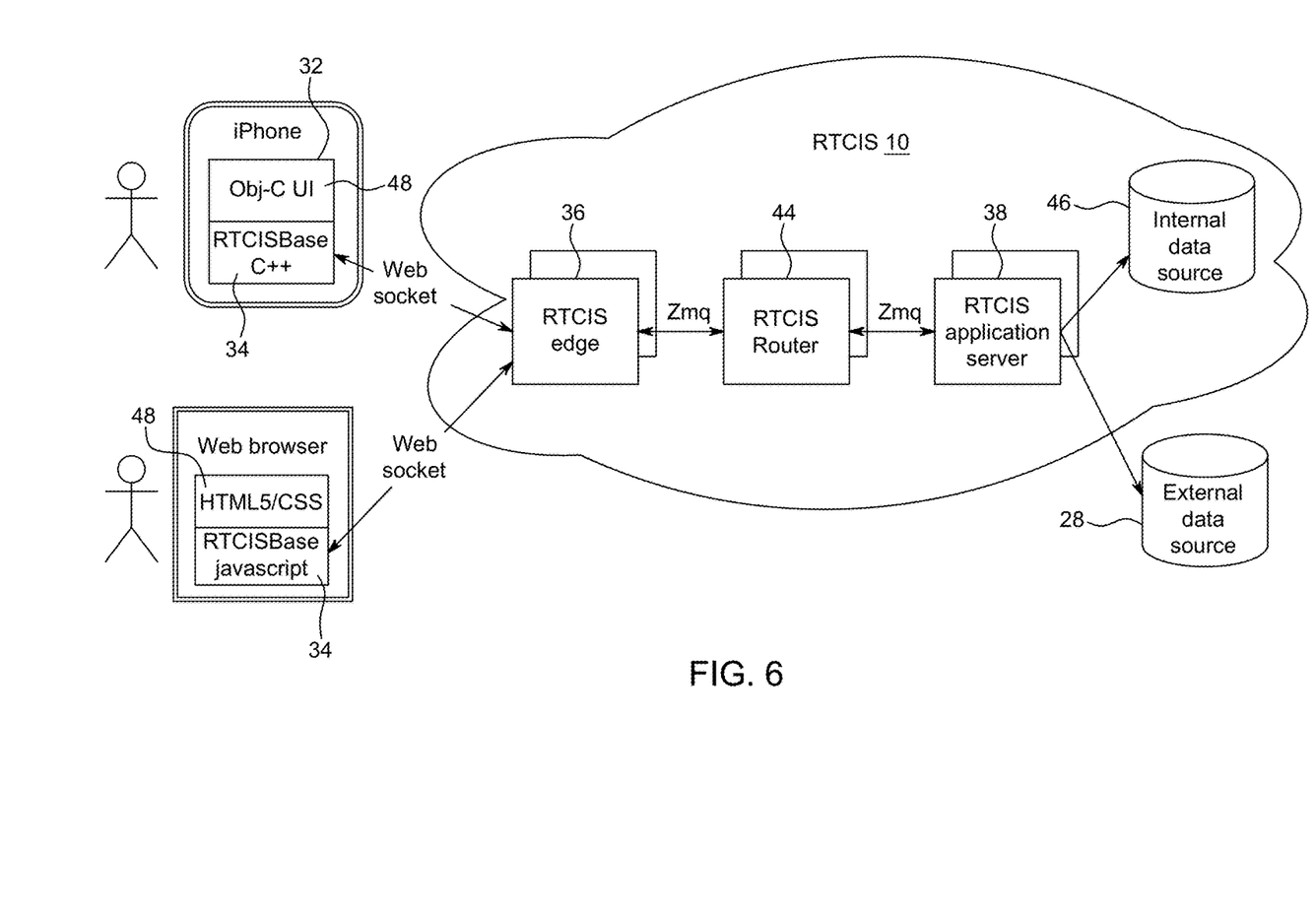
FIG. 6 illustrates functional components of the cloud information service.

FIG. 6 shows the RTCIS Mobile Application 32 on iOS connected to the RTCIS 10 via edge server 36 via WebSockets using the RTCIS Base C++ Library 34. This is how in-network users 12 connect to the RTCIS 10. For out-of-network users 14, the web browsers 31 (RTCIS Web Clients) on the desktop 20 and mobile 18 are also connected to RTCIS 10 via the RTCIS Base library 34, in this case a Javascript library, to the RTCIS Edge Server 36. The RTCIS Edge Server 36 maintains WebSocket sessions and handles HTTP requests from clients. The Edge Server 36 also manages user authentication. The RTCIS Router 44 implements Remote Procedure Calls (RPC) between Application Server 38 and Edge Server 36, using a high performance asynchronous messaging library such as ZeroMQ. The RTCIS Application server 38 implements all business logic, data retrieval and data modification tracking. It updates clients when a data update is detected. The RTCIS architecture supports a variety of data storage mechanisms such as internal data source 46 and external data source 28. For data storage, preferably the user ID is used as the first element of the object path for sharding and isolation of user partitions.

The RTCIS Base Library 34 implements a cache that resides on the mobile devices and also web browsers and uses the Web Sockets to connect to the RTCIS Cloud Service. This RTCIS Base Library 34 gets "RTCIS PUSH"

notifications when any of the objects in the cache have changed in the RTCIS 10. The RTCIS 10 decides the set of SmartCards that need to be updated when the target source changes and sends RTCIS PUSH notifications to these clients. Then the WebSockets layer provides the new content to the Base Library 34, which preferably implements its cache in the form of an HTML5 cache. This permits the updates to be in near real-time as a) only the changes are notified and b) only the changed objects are fetched back from the server. This is very efficient in the mobile world in network usage as only changes are intelligently determined and pushed to the HTML5 pages. This is also performed via RTCIS PUSH Notifications and not polling.

Figure 7:
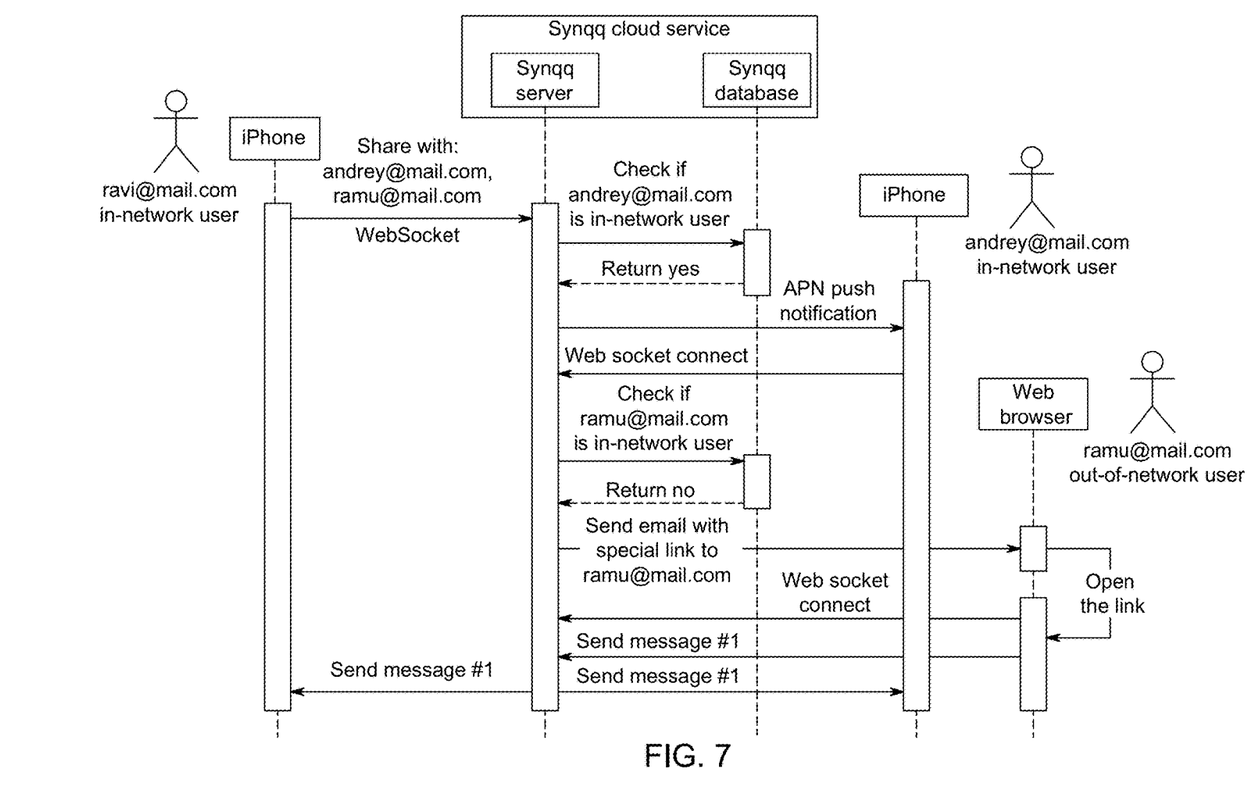
FIG. 7 is a flow diagram illustrating details of operation of information exchange in the cloud information service.

FIG. 7 illustrates a flow diagram of a scenario when a user is using Mobile Application 32 to share a RTCIS Smartcard 30 with two users one of which is In-Network user 12 and other is Out-of-Network user 14. After that the out-of-network user 14 sends a text message to other users in the group. In-Network user ravi@mail.com shares a SmartCard 30 with andrey@mail.com and ramu@mail.com. The Mobile Application 32 connects to the RTCIS 10 using Object Protocol over Websockets. RTCIS 10 responds by accessing a database to check if andrey@mail.com is an in-network user. In this case andrey@mail.com is an in-network user. The RTCIS 10 responds by sending a push notification such as an Apple Push Notification to Mobile Application 32 which wakes up, connects to RTCIS 10 and loads all updates including the shared SmartCard 30. The RTCIS 10 checks if ramu@mail.com is an in-network user. In this case ramu@mail.com is an out-of-network user. The RTCIS 10 sends an email notification to ramu@mail.com. This email contains a URL to an object stored on RTCIS 10. ramu@mail.com (the user) clicks the link and opens the web client which opens a WebSocket connection to RTCIS 10 and loads the shared SmartCard 30. The user ramu@mail.com sends text message #1 related to the SmartCard 34. The message is stored to RTCIS 10 and the RTCIS PUSH notification is sent to andrey@mail.com and ravi@mail.com. Then RTCIS 10 sends the message over RTCIS Object Protocol to in-network user andrey@mail.com. The RTCIS 10 also sends the message over RTCIS Object Protocol to in-network user ravi@mail.com when RTCIS Base Libraries fetch the new message.

Figure 8:
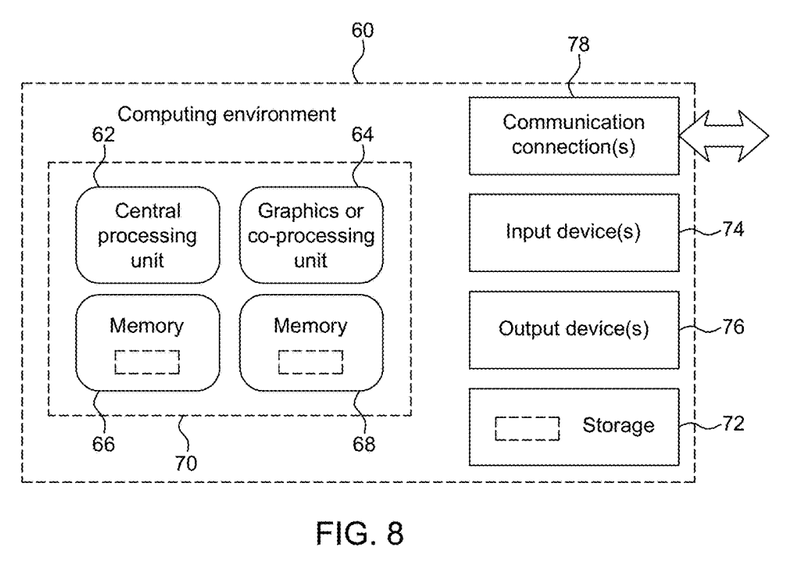
FIG. 8 illustrates a block diagram of a hardware that may be employed in an implementation of the cloud information service.

FIG. 8 depicts a generalized example of a suitable general purpose computing system 60 in which the described innovations may be implemented. The computing system 60 is not intended to suggest any limitation as to scope of use or functionality, as the innovations may be implemented in diverse general-purpose or special-purpose computing systems. For example, the computing system 60 can be any of a variety of computing devices (e.g., desktop computer, laptop computer, server computer, tablet computer, media player, gaming system, mobile device, etc.).

With reference to FIG. 8, the computing system 60 includes one or more processing units 62, 64 and memory 66, 68. In FIG. 32, this basic configuration 70 is included within a dashed line. The processing units 62, 64 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 32 shows a central processing unit 62 as well as a graphics processing unit or co-processing unit 64. The tangible memory 66, 68 may be volatile memory (e.g., registers, cache, RAM), non-volatile memory (e.g., ROM, EEPROM, flash memory, etc.), or some combination of the two, accessible by the processing unit(s). In some implementations, the memory 66, 68 stores software implementing, at least in part, one or more innovations described herein, in the form of computer-executable instructions suitable for execution by the processing unit(s).

Computing system 60 may have additional features such as for example, storage 72, one or more input devices 74, one or more output devices 76, and one or more communication connections 78. An interconnection mechanism (not shown) such as a bus, controller, or network interconnects the components of the computing system 60. Typically, operating system software (not shown) provides an operating system for other software executing in the computing system 60, and coordinates activities of the components of the computing system 60.

The tangible storage 72 may be removable or non-removable, and includes magnetic disks, magnetic tapes or cassettes, CD-ROMs, DVDs, or any other medium which can be used to store information in a non-transitory way and which can be accessed within the computing system 60. The storage 72 stores instructions for the software implementing one or more innovations described herein.

The input device(s) 74 may be a touch input device such as a keyboard, mouse, pen, or trackball, a voice input device, a scanning device, or another device that provides input to the computing system 60. For video encoding, the input device(s) 74 may be a camera, video card, TV tuner card, or similar device that accepts video input in analog or digital form, or a CD-ROM or CD-RW that reads video samples into the computing system 60. The output device(s) 76 may be a display, printer, speaker, CD-writer, or another device that provides output from the computing system 60.

The communication connection(s) 78 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computerized method for enabling communication of data between mobile devices in real-time, comprising:
   providing a real-time contextualized messaging service for subscribed users of mobile devices, and providing an application to facilitate data communication by the subscribed users with the real-time contextualized messaging service in an organized visual format;
   providing updates to data provided by the application in real-time;
   providing, in real time, data shared by a subscribed user of a first mobile device to a second mobile device of a non-subscribed user in a visual format that is substantially similar to the organized visual format provided to the first mobile device of the subscribed user; and
   providing, in real time, a response from the second mobile device of the non-subscribed user to the first mobile device of the subscribed user.

2. A computerized method for providing updates to data in real-time comprising:
   providing to a mobile device of an in-network user, the in-network user being subscribed to a real-time contextualized messaging service, an update to data in real-time within an application executing on the mobile computing device of the in-network user;
   providing to an out-of network user, the out-of network user not being subscribed to the real-time contextualized messaging service, an update to data in real-time within an application executing within a browser on a computing device of the out-of network user; and
   storing the data in the form of objects and responding to a change in data corresponding to an object by updating the object and providing the object to the application executing on the mobile device of the in-network user in real-time upon notification of the change in data.

3. The computerized method of claim 2 further comprising providing the object to the application executing on the mobile device of the in-network user by way of a push notification.

4. The computerized method of claim 2 further comprising providing a base library, if the base library is not present on the computing device of the out-of network user, by providing a link to the device of the out-of network user in real-time, upon communication from the in-network user to the out-of network user, and providing the base library upon activation of the link.

5. The computerized method of claim 2 wherein the application executing on the mobile device of the in-network user, and the application executing within the browser of the computing device of the out-of network user, both display the data visually in the form of a rectangular card shaped container that provides input and output for interacting with the data.

6. The computerized method of claim 5 wherein the rectangular card has associated with it a lifespan that determines a length of time in which the card will be displayed.

7. The computerized method of claim 5 wherein the rectangular card has associated therewith a plurality of connection properties related to a source of the data.

8. A computerized method for providing updates to data in real-time comprising:
   generating and providing to a first user's computing device, the first user being subscribed to a real-time messaging service, a smartcard containing at least a first dataset, the smartcard providing a context characterized by data corresponding to the dataset, wherein the smartcard provides data visually in the form of a rectangular card shaped container that provides input and output for interacting with the data;
   providing upon a change of data in the dataset, in real-time, an update to the smartcard to update the data in the dataset on the smartcard; and
   generating and providing to a second user's computing device, data corresponding to the dataset along with formatting codes to cause the data corresponding to the dataset to be visually presented by the second user's computing device in a manner substantially similar to the smartcard as displayed by the first user's computing device, wherein the second user is not subscribed to the real-time messaging service.

9. A computerized method as set forth in claim 8 wherein providing upon a change of data in the dataset an update to the smartcard to update the data in the dataset on the smartcard comprises:
   identifying a change in an object corresponding to at least a subset of data in the dataset, and
   providing the object for use to update the smartcard.

10. A computerized method as set forth in claim 9 further comprising providing a link to the object to the second user's computing device.

11. A computerized method as set forth in claim 10 wherein the link is transmitted by way of an SMS message.

12. A computerized method as set forth in claim 10 wherein the link is transmitted by way of an e-mail message.

13. A computerized method as set forth in claim 8 wherein the rectangular card has associated with it a lifespan that determines a length of time in which the card will be displayed.

14. A computerized method as set forth in claim 13 wherein the rectangular card has associated therewith a plurality of connection properties related to a source of the data.

15. A computerized method as set forth in claim 8 wherein at least a subset of the data is obtained from a third-party source.

16. A computerized method as set forth in claim 8 wherein the smartcard provides contextualized information, the method further comprising:
   determining whether the change of data in the dataset corresponds to contextualized information of a selected smartcard and updating the selected smartcard with the change if the change corresponds to contextualized information of the selected smartcard.

17. The computerized method of claim 5 wherein the real-time contextualized messaging service provides contextualized updates to information displayed by the application executing on the mobile device of the in-network user by processing updates to data by determining if the updates to data are related to data being displayed by the application executing on the mobile device of the in-network user and updating the data being displayed by the application executing on the mobile device of the in-network user when the updates to data are determined to be relevant to the data being displayed by the application executing on the mobile device of the in-network user.

\* \* \* \* \*